(12) United States Patent
Gajda et al.

(10) Patent No.: US 11,135,954 B1
(45) Date of Patent: Oct. 5, 2021

(54) CUSHION PAN INTEGRATION BRACKET

(71) Applicant: Ford Global Technologies, LLC, Dearborn, MI (US)

(72) Inventors: Lukasz Gajda, Royal Oak, MI (US); Joshua Gauthier, South Lyon, MI (US); Ian G. James, Windsor (CA); Travis Pierce, Ferndale, MI (US); Bradley Bysouth, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/822,849

(22) Filed: Mar. 18, 2020

(51) Int. Cl.
*B60N 2/68* (2006.01)

(52) U.S. Cl.
CPC ............. *B60N 2/682* (2013.01); *B60N 2/686* (2013.01)

(58) Field of Classification Search
CPC ................................. B60N 2/682; B60N 2/686
USPC ............. 297/452.18, 452.55, 452.39, 344.17
See application file for complete search history.

(56) References Cited

U.S. PATENT DOCUMENTS

| | | | |
|---|---|---|---|
| 4,781,417 A | 11/1988 | Shipman et al. | |
| 4,850,644 A * | 7/1989 | Kazaoka | B60N 2/0715 297/325 |
| 5,284,381 A * | 2/1994 | Aoki | B60N 2/68 297/452.1 |
| 5,626,395 A * | 5/1997 | Aufrere | B60N 2/682 297/344.15 |
| 6,203,091 B1 * | 3/2001 | Kojima | B60N 2/682 296/65.05 |
| 8,684,462 B2 | 4/2014 | Brewer et al. | |
| 10,052,988 B2 | 8/2018 | Hoshi | |
| 10,239,431 B2 | 3/2019 | Line et al. | |
| 10,391,910 B2 | 8/2019 | Line et al. | |
| 10,427,554 B2 | 10/2019 | Ketels et al. | |
| 10,913,379 B2 * | 2/2021 | Gajda | B60N 2/42709 |
| 2010/0237216 A1 * | 9/2010 | Napau | B60N 2/0232 248/422 |
| 2012/0187735 A1 * | 7/2012 | Foelster | B60N 2/164 297/344.17 |
| 2015/0307010 A1 * | 10/2015 | Nakagawa | B60N 2/1615 297/452.18 |
| 2016/0052437 A1 * | 2/2016 | Hoshi | B60N 2/682 297/452.18 |
| 2018/0079326 A1 * | 3/2018 | Hayashi | B60N 2/1615 |
| 2018/0105083 A1 * | 4/2018 | Tsuzaki | B60N 2/5657 |
| 2018/0272906 A1 * | 9/2018 | Onuma | B60N 2/682 |

(Continued)

FOREIGN PATENT DOCUMENTS

| | | | | |
|---|---|---|---|---|
| DE | 102016224625 A1 * | 6/2018 | ............ | B60N 2/3013 |
| DE | 202020100065 U1 * | 1/2020 | ............. | B60N 2/028 |

*Primary Examiner* — Jose V Chen
(74) *Attorney, Agent, or Firm* — David Coppiellie; Price Heneveld LLP

(57) ABSTRACT

A seat for a vehicle seating assembly includes a seat frame including a cross-member extending across a front portion of the seat frame and a cushion pan assembly rotatably coupled to the seat frame and including a cushion pan and a pair of opposing integration brackets each having a cushion pan mounting portion coupled to the cushion pan and a seat frame mounting portion pivotably coupled to the seat frame. The cushion pan assembly is rotatable about an axis defined by a pivotable coupling between the integration bracket and the seat frame and between a design position and a fully upward position.

20 Claims, 16 Drawing Sheets

(56) References Cited

U.S. PATENT DOCUMENTS

| | | | | |
|---|---|---|---|---|
| 2018/0339613 A1* | 11/2018 | Mizobata | ............ | B60N 2/42745 |
| 2019/0023156 A1* | 1/2019 | Ninagawa | ................ | B60N 2/70 |
| 2019/0255974 A1* | 8/2019 | Inoue | ................... | B60N 2/2893 |
| 2019/0389349 A1* | 12/2019 | Sztajnert | ................ | B60N 2/682 |
| 2021/0001756 A1* | 1/2021 | Becker | ................ | B60N 2/0224 |
| 2021/0039533 A1* | 2/2021 | Morille | ................. | B60N 2/682 |

* cited by examiner

CUSHION PAN INTEGRATION BRACKET

FIELD OF THE DISCLOSURE

The present disclosure generally relates to a support bracket for a seating assembly.

BACKGROUND OF THE DISCLOSURE

Seating assemblies may include a cushion pan for supporting a seat cushion. The position of the cushion pan may be adjusted. A support bracket may support the cushion pan.

SUMMARY OF THE DISCLOSURE

According to one aspect of the present disclosure, a seat for a vehicle seating assembly includes a seat frame having a cross-member extending across a front portion of the seat frame and a cushion pan assembly rotatably coupled to the seat frame and including a cushion pan and a pair of opposing integration brackets each having a cushion pan mounting portion coupled to the cushion pan and a seat frame mounting portion pivotably coupled to the seat frame. The cushion pan assembly is rotatable about an axis defined by a pivotable coupling between the integration bracket and the seat frame and between a design position and a fully upward position.

Embodiments of the first aspect of the disclosure can include any one or a combination of the following features:
- the cushion pan mounting portion is configured to attach to the integration bracket;
- the cushion pan mounting portion includes a hook extending downward from an inner flange and parallel to a plane substantially normal to the axis;
- the hook is positionable around the cross-member;
- the cushion pan mounting portion includes a locating pin extending into the cushion pan;
- the seat frame mounting portion incudes a flange extending downward from and transverse to the cushion pan mounting portion;
- the flange extends along a plane substantially normal to the axis;
- the flange is disposed against the seat frame when the cushion pan is in the design position, and wherein an interface between the flange and the seat frame limits lateral movement of the integration bracket relative to the seat frame; and
- the seat frame includes opposing side brackets and wherein the flange is disposed against one of the opposing side brackets of the seat frame.

According to a second aspect of the present disclosure, a vehicle seat has an integration bracket with a cushion pan mounting portion and a seat frame mounting portion, a cushion pan, and a seat frame. The cushion pan is disposed on the cushion pan mounting portion of the integration bracket. The integration bracket is pivotably coupled to the seat frame and is rotatable about an axis extending laterally through the seat frame between a design position and a fully upward position. The seat frame mounting portion includes an outer flange that abuts the seat frame when the integration bracket is in the design position.

Embodiments of the second aspect of the disclosure can include any one or a combination of the following features:
- the seat frame includes a side bracket, and wherein the side bracket includes a side flange that abuts the outer flange when the integration bracket is in the design position;
- the integration bracket has a pair of opposing integration brackets, wherein the side bracket includes a pair of opposing side brackets and the cushion pan is coupled to the cushion pan mounting portions of each of the integration brackets;
- the flanges of each of the opposing integration brackets abut side flanges of each of the opposing side brackets when the cushion pan is in the design position;
- the flange is disposed along a plane substantially normal to the axis; and
- a cross-member is laterally disposed in the seat frame, wherein the cushion pan mounting portion includes a hook that is positionable around the cross-tube, wherein the cross-member moves with the cushion pan as the cushion pan moves between the design position and the fully upward position.

According to a third aspect of the present disclosure, a method of manufacturing a vehicle seat includes constructing a seat frame, operably coupling a cushion pan assembly with a cushion pan supported by a pair of opposing integration brackets to a cross-member of the seat frame, rotating the cushion pan assembly from an installation position to a design position, and rotatably coupling seat frame mounting portion of the pair of opposing integration brackets of the cushion pan assembly to the seat frame to define an axis of rotation about which the cushion pan assembly rotates between a design position to a fully upward position.

Embodiments of the third aspect of the disclosure can include any one or a combination of the following features:
- positioning the seat frame mounting portion of each of the opposing integration brackets adjacent to the seat frame;
- forming a mating fit between the seat frame mounting portion and the seat frame to minimize lateral movement of the cushion pan assembly relative to the seat frame;
- operably coupling a cushion pan assembly, with a cushion pan supported by a pair of opposing integration brackets, to a cross-member of a seat frame with positioning hooks of the pair of opposing integration brackets around the cross-member;
- fabricating the cushion pan assembly from a composite; and
- fabricating the cushion pan assembly as an integral part.

These and other aspects, objects, and features of the present disclosure will be understood and appreciated by those skilled in the art upon studying the following specification, claims, and appended drawings.

DETAILED DESCRIPTION

Figure 1:
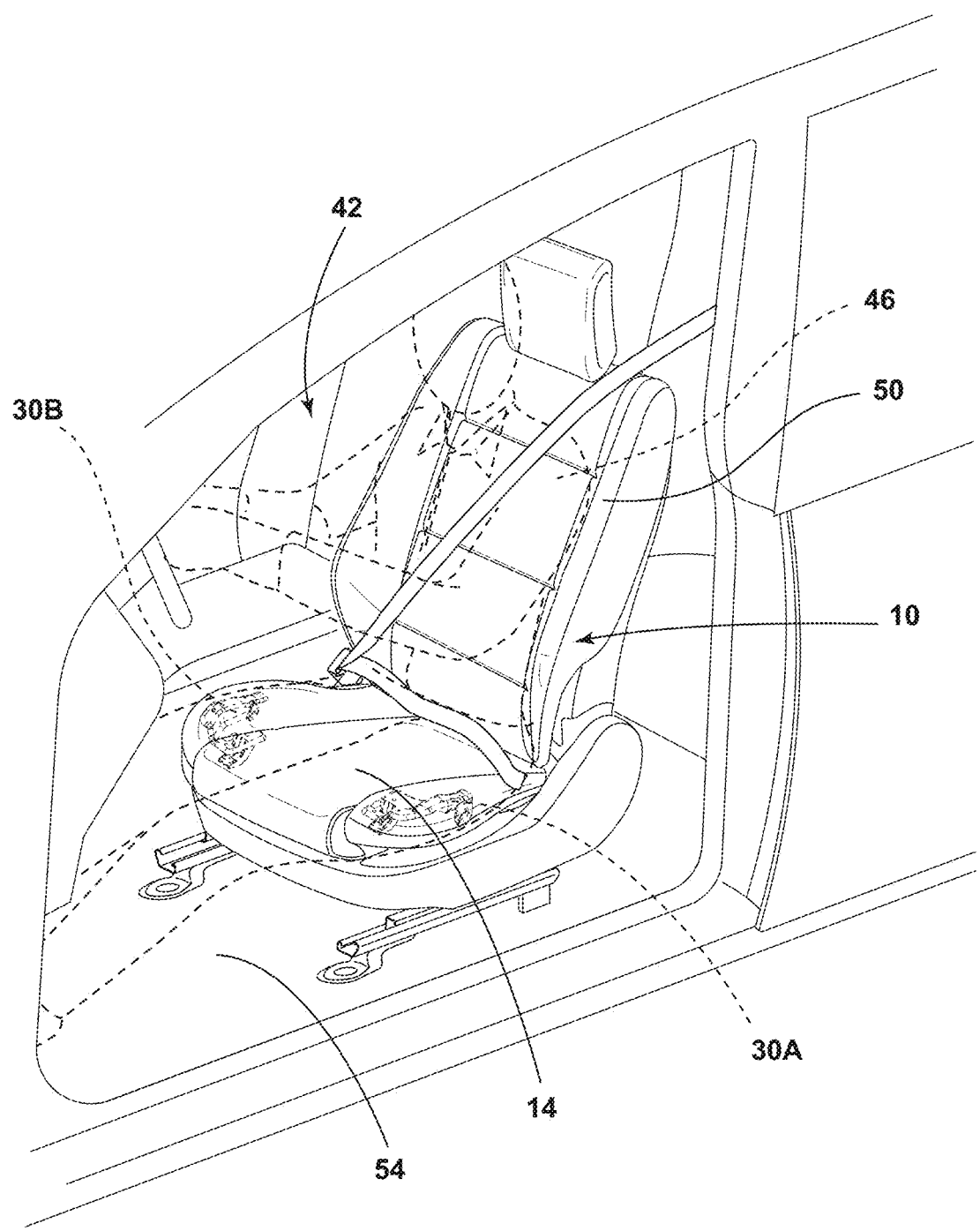
FIG. 1 is a perspective view of a vehicle seating assembly and opposing integration brackets.

With reference to the seating assembly 10 described below and shown in the attached figures, a seating assembly 10 may be described from the vantage point of an occupant 46 seated in the seating assembly 10. The side of a seating assembly 10 disposed on a right side of a seated occupant 46 may be referred to as a right side or a first side of the seating assembly 10. The side of the seating assembly 10 disposed on a left side of a seated occupant 46 may be referred to as a left side or a second side of the seating assembly 10.

Referring to FIGS. 1-12, a seat for a vehicle seating assembly 10 includes a seat frame 18 and a cushion pan assembly 22 rotatably coupled to the seat frame 18. The seat frame 18 includes a cross-member (for example, cross-tube 24) extending across a front portion of the seat frame 18. The cushion pan assembly 22 includes a cushion pan 26 and a pair of opposing integration brackets 30A, 30B each including a cushion pan mounting portion 34A, 34B coupled to the cushion pan 26 and a seat frame mounting portion 36A, 36B pivotably coupled to the seat frame 18. The cushion pan assembly 22 is rotatable about an axis defined by pivotable couplings 38A, 38B between the integration bracket and the seat frame 18 and between a design position A and a fully upward position B.

Vehicle occupants desire comfortable seating. Stability of a cushion pan 26 disposed within the seat 14 may contribute to the comfort of an occupant 46 during travel. Left and right integration brackets 30A, 30B disposed between the cushion pan 26 and the seat frame 18 may include features (outer flanges 82A and 82B, locating pins 138A and 138B) that may minimize or limit lateral or side-to-side movement of the cushion pan assembly 22 relative to the seat frame 18. Left and right integration brackets 30A, 30B may include features (ribs 134A, 134B) that may minimize movement, vibrations, and BSR (buzz, squeak and rattle) of the left and right integration brackets 30A, 30B relative to the seat cross-tube 24. As such, features of left and right integration brackets 30A, 30B may improve seat stability and may minimize seat noise.

Referring to FIG. 1, a seating assembly 10 is shown disposed in a vehicle interior 42. An occupant 46 may be seated in the seating assembly 10. The seating assembly 10 may include a seat 14 and a seatback 50. The seatback 50 may be pivotably coupled to the seat 14. The seating assembly 10 may be slidable along a vehicle floor 54. A left integration bracket 30A and a right integration bracket 30B may be disposed in the seat 14.

Figure 2:
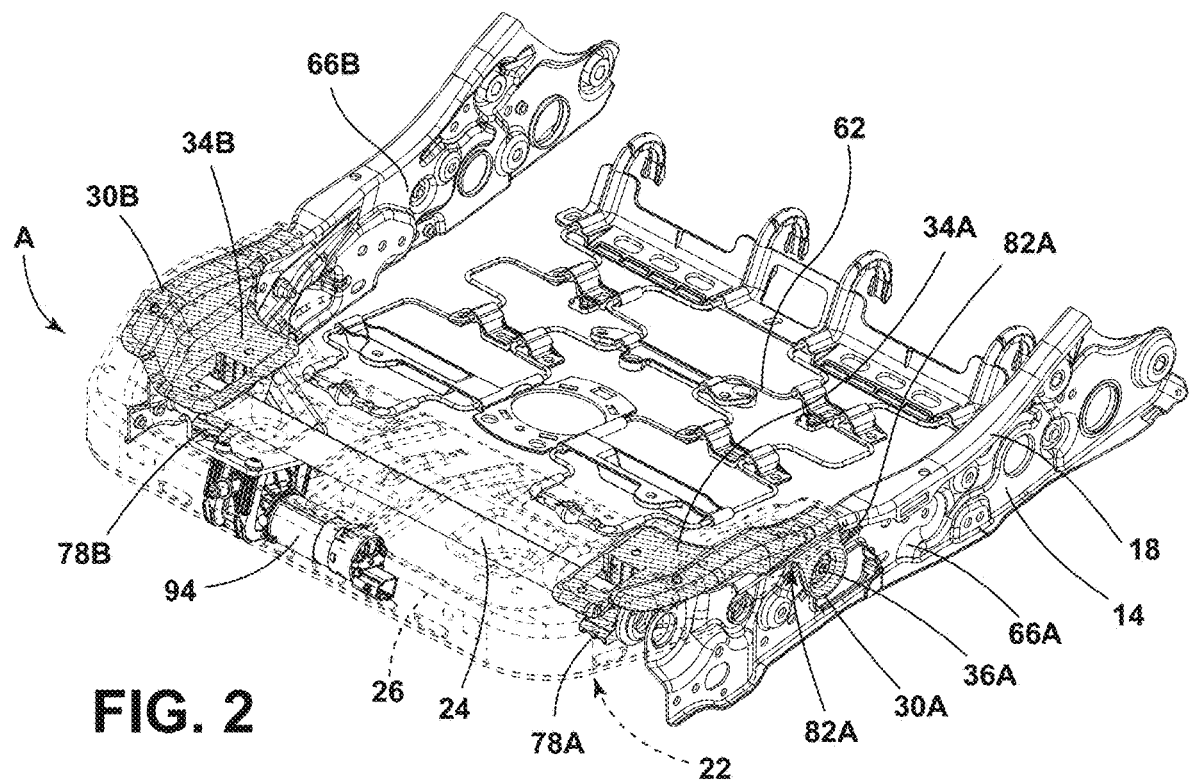
FIG. 2 is a perspective view of a seat frame, a suspension, a cushion pan, and opposing integration brackets.
Figure 3:
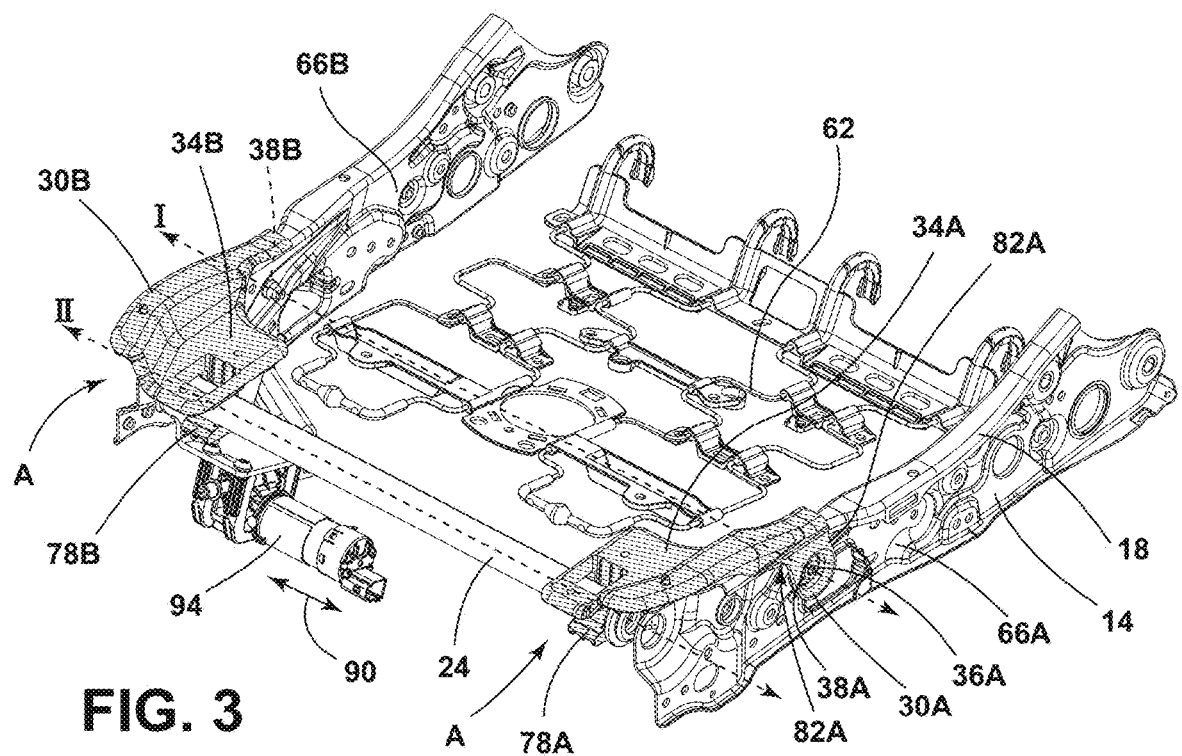
FIG. 3 is a perspective view of a seat frame, a suspension, opposing integration brackets, and a cross-tube.

Referring now to FIGS. 2-3, a perspective view of the seat frame 18, the suspension 62, the cushion pan 26, the left integration bracket 30A and the right integration bracket 30B is shown. The seat frame 18 may include a left side bracket 66A and a right side bracket 66B. The suspension 62 may include an arrangement of flexible wires disposed between a front area of the seat 14 and extending to an attachment assembly configured to be disposed around a cross-bar at the rear of the seat 14. The left integration bracket 30A and the right integration bracket 30B each may include a respective cushion pan mounting portion 34A, 34B and a respective seat frame mounting portion 36A, 36B. The cushion pan mounting portion 34A, 34B may be disposed toward the front of the seat 14 and may be fastened to the cushion pan 26. The cushion pan mounting portion 34A, 34B may include a downward extending hook 78A, 78B that may be disposed around the cross-tube 24 of the seat 14. The seat frame mounting portion 36A, 36B of each of the left and right integration brackets 30A, 30B may be disposed toward the back of the seat 14 and may include pivotable couplings 38A, 38B. The left and right integration brackets 30A, 30B may each be positioned above the respective left and right side brackets 66A, 66B. The left and right integration brackets 30A, 30B may each be positioned below the cushion pan 26. The left and right integration brackets 30A, 30B may support the cushion pan 26. The seat frame mounting portions 36A, 36B of the left and right integration brackets 30A, 30B may include apertures 86A, 86B (see FIGS. 5, 8B, 8C, 9B, 9C, and 11A) for pivotably coupling the left and right integration brackets 30A, 30B to the seat frame 18. The seat frame mounting portions 36A, 36B of the left and right integration brackets 30A, 30B may position the left and right integration brackets 30A, 30B, along with the cushion pan 26, on the seat frame 18 so that movement of the cushion pan 26 and the left and right integration brackets 30A, 30B relative to the seat frame 18 in the direction shown by arrow 90 may be minimized. FIG. 2 shows the cushion pan 26 and the left and right integration brackets 30A, 30B in a design position A.

With reference to FIG. 3, an axis I extending laterally through the left and right side brackets 66A, 66B is shown. The axis I may extend through the pivotable coupling 38A of the left integration bracket 30A and the left side bracket 66A and the pivotable coupling 38B of the right integration bracket 30B and the right side bracket 66B. An axis II may extend through the cross-tube 24. A motor 94 for moving the cushion pan assembly 22 between the design position A and the fully upward position B is shown disposed below the cushion pan 26. In some examples, activation of the motor 94 may cause the cross-tube 24 to rotate about itself to move the cushion pan assembly 22 between the design position A and the fully upward position B. The cross-tube 24 may move with the cushion pan assembly 22 as the cushion pan assembly 22 moves between the design position A and the fully upward position B. The cushion pan 26 and the left and right integration brackets 30A, 30B may also be positionable in intermittent positions between the design position A and the fully upward position B. It is contemplated that in some examples the cushion pan assembly 22 may be moved manually between the design position A and the fully upward position B and intermittent positions between the design position A and the fully upward position B. A seating assembly 10 occupant 46 may adjust the position of the cushion pan 26 according to the preference of the occupant 46. The left and right integration brackets 30A, 30B are shown in a design position A in FIG. 3.

Figure 4:
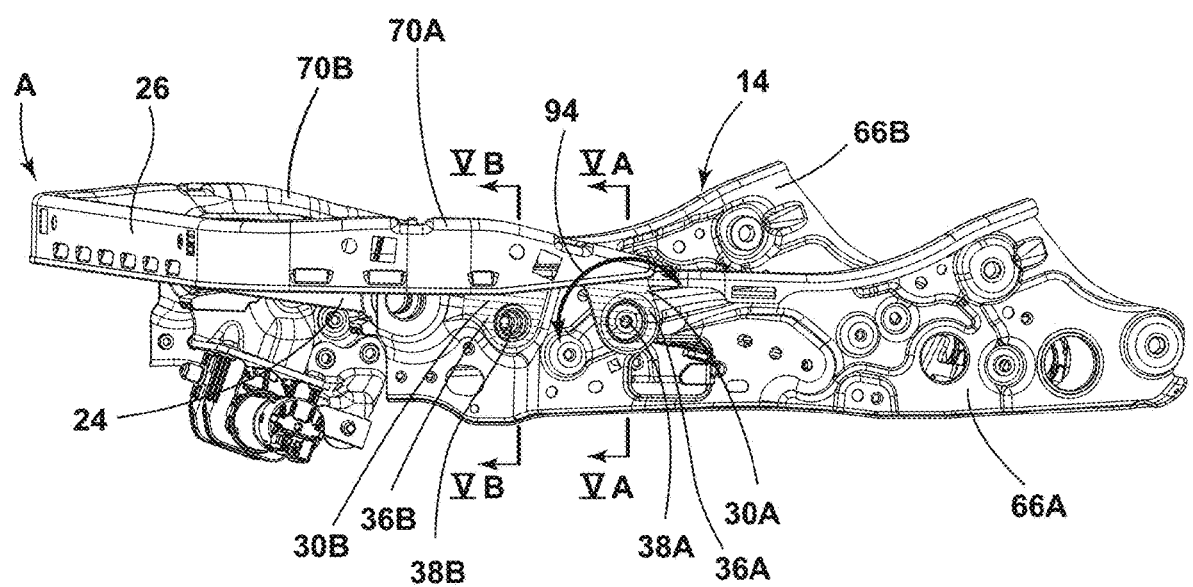
FIG. 4 is perspective view of a seat frame, a cushion pan, opposing integration brackets, and a cross-tube.

Referring now to FIG. 4, a left side perspective view shows the left integration bracket 30A and the right integration bracket 30B supporting the cushion pan 26. The seat frame mounting portions 36A, 36B of the respective left integration bracket 30A and the right integration bracket 30B may each be pivotably coupled to a respective left side bracket 66A and a respective right side bracket 66B at respective pivotable couplings 38A, 38B. The cushion pan 26 is shown in the design position A. The cushion pan 26 may include left and right cushion pan bolsters 70A, 70B. The left and right cushion pan bolsters 70A, 70B may be disposed over the cushion pan mounting portions 34A, 34B of each of the left integration bracket 30A and the right integration bracket 30B. As the cushion pan 26 moves between the design position A and the fully upward position B, the left and right integration brackets 30A, 30B may rotate about the axis of rotation I between the design position A and the fully upward position B along with the cushion pan 26.

Figure 5A:
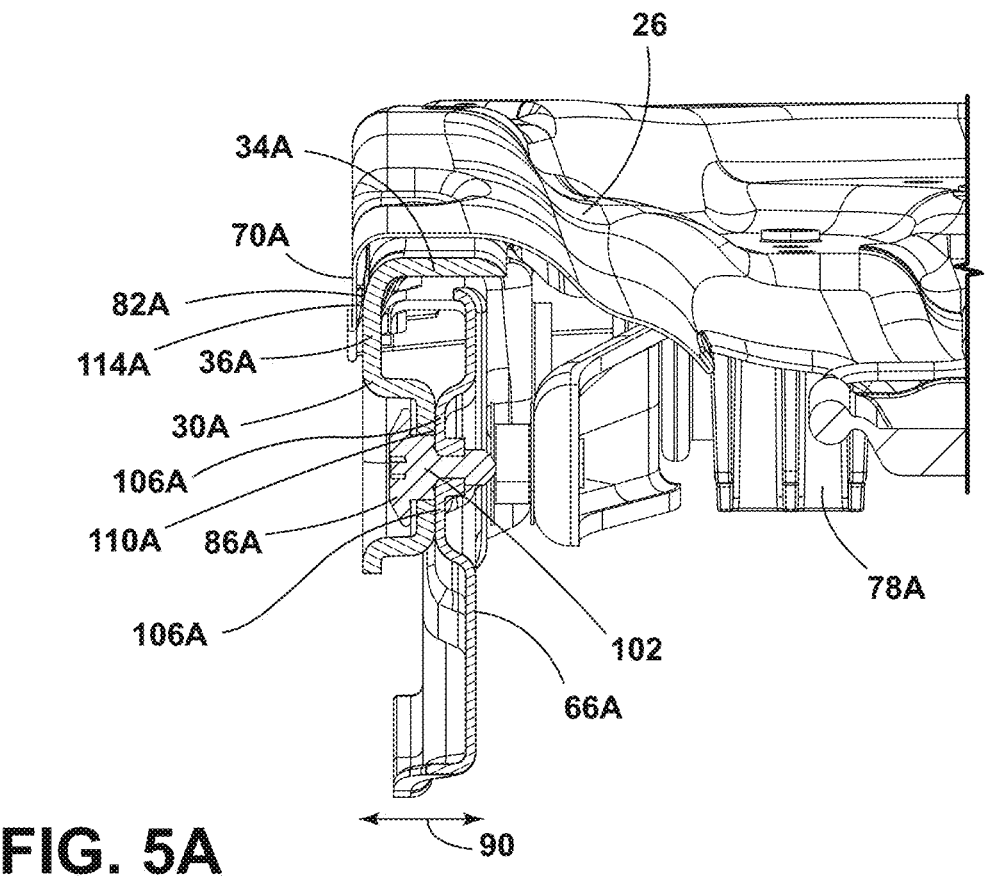
FIG. 5A is a cross-sectional view taken along VA-VA of FIG. 4 of a left integration bracket, a cushion pan, and a seat frame.

Referring now to FIG. 5A, a cross-sectional view of a left integration bracket 30A taken along line VA-VA of FIG. 4 is shown. A fastener 102 may extend through the left integration bracket 30A and the left side bracket 66A. The seat frame mounting portion 36A of the left integration bracket 30A is shown adjacent to a protrusion 106A of the side bracket 66A. A mating fit 110A between the seat frame mounting portion 36A of the left integration bracket 30A and the protrusion 106A of the left side bracket 66A may maintain the position of the cushion pan assembly 22 relative to the seat frame 18 and may minimize movement of the cushion pan assembly 22 in the lateral direction (shown by arrow 90) relative to the seat frame 18. The mating fit 110A may also include an arrangement in which the seat frame mounting portion 36A of the left integration bracket 30A is adjacent to or abuts the protrusion 106A of the left side bracket 66A. The left cushion pan bolster 70A and the outer flange 82A of the left integration bracket 30A may form a contoured fit 114A. The contoured fit 114A may include an arrangement in which the left cushion pan bolster 70A and the outer flange 82A abut or are adjacent to one another.

FIG. 5A shows the left side of the seat 14. The right side of the seat 14 is similar to the left side of the seat 14 shown in FIG. 5A. The seat frame mounting portion 36B of the right integration bracket 30B may be positioned adjacent to the protrusion 106B of the side bracket 66B. The mating fit 110B between the seat frame mounting portion 36B of the right integration bracket 30B and the protrusion 106B of the right side bracket 66B may maintain the position of the cushion pan assembly 22 relative to the seat frame 18 and may minimize movement of the cushion pan assembly 22 in the lateral direction (arrow 90) relative to the seat frame 18. The mating fit 110B may also include an arrangement in which the seat frame mounting portion 36B of the right integration bracket 30B is adjacent to or abuts the protrusion 106B of the right side bracket 66B. The right cushion pan bolster 70B and the outer flange 82B of the right integration bracket 30B may form a contoured fit 114B. The countered fit 114B may include an arrangement in which the right cushion pan bolster 70B and the outer flange 82B abut or are adjacent to one another. As such, the mating fits 110A, 110B may contribute to seat stability and reduce seat noise.

Figure 5B:
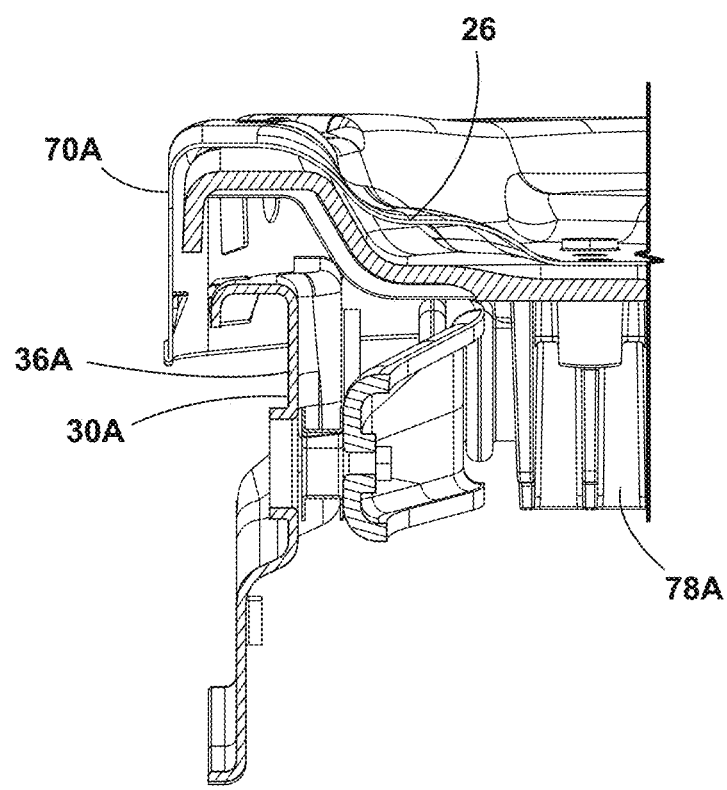
FIG. 5B is a cross-sectional view taken along VB-VB of FIG. 4 of a left integration bracket, a cushion pan, and a seat frame.

Referring to FIG. 5B, a cross-sectional view of the integration bracket 30A taken along line VB-VB of FIG. 4 is shown. The seat frame mounting portion 36A of the integration bracket 30A is shown. The hook 78A is shown.

FIG. 5B shows the left side of the seat 14. The right side of the seat 14 is similar to the left side of the seat 14 shown in FIG. 5A.

Figure 6:
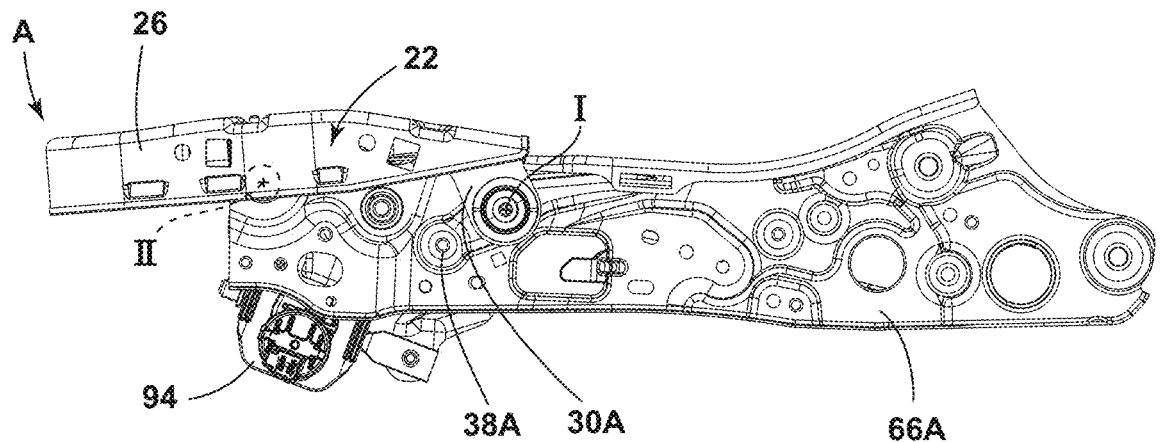
FIG. 6 is a left side elevational view of a seat frame with the cushion pan and the integration bracket in a design position.
Figure 7:
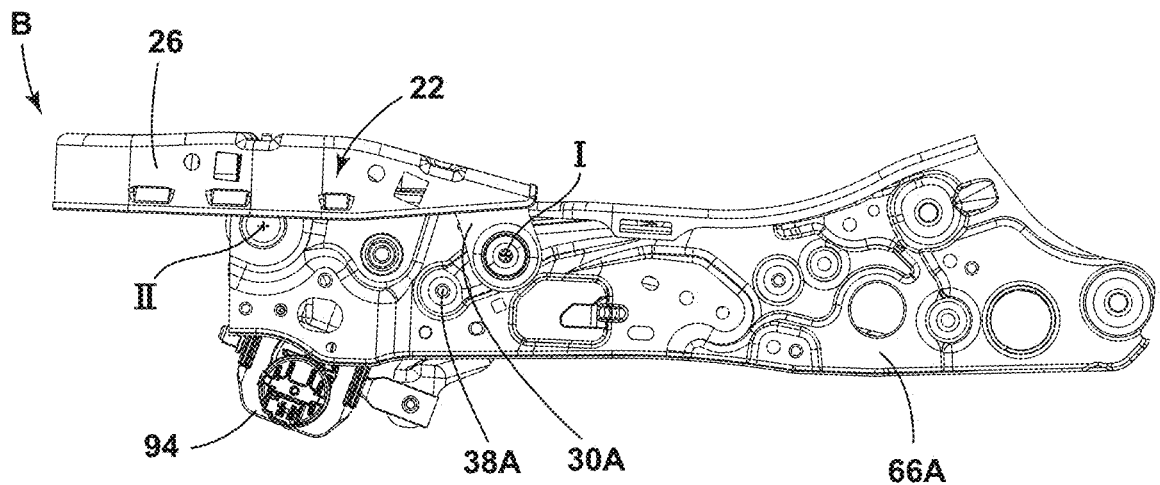
FIG. 7 is a left side elevational view of the seat frame with the cushion pan and the integration bracket of FIG. 6 in a fully upward position.

Referring to FIGS. 6-7, the cushion pan assembly 22 is shown in the design position A (FIG. 6) and in the fully upward position B (FIG. 7). The cushion pan 26 is shown in the design position A (FIG. 6) and the fully upward position B (FIG. 7). The left integration bracket 30A is shown in the design position A (FIG. 6) and in the fully upward position B (FIG. 7). Axis I may extend through the pivotable couplings 38A, 38B between the left integration bracket 30A and the left side bracket 66A and the pivotable coupling 38B between the right integration bracket 30B and the right side bracket 66B. The cross-tube 24 defines axis II in the design position A.

Figure 8A:
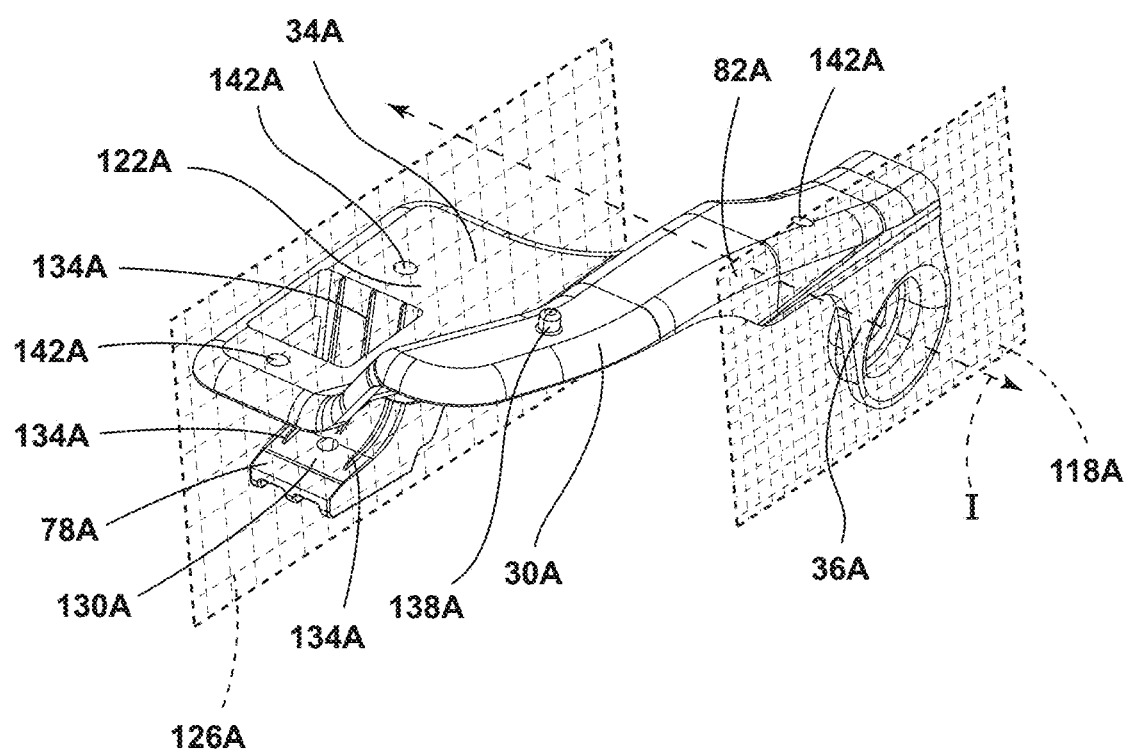
FIG. 8A is a perspective view of a left integration bracket.

Referring to FIGS. 8A-8G, a series of views of the left integration bracket 30A are shown. FIGS. 9A-9G show the corresponding views of the right integration bracket 30B. Features of the left integration bracket 30A that may correspond to features of the right integration bracket 30B are assigned the same number and different letters. Parts with the same numbers shown on both the left and right integration brackets 30A, 30B and the left and right side brackets 66A, 66B may perform the same functions. With reference to FIG. 8A, a perspective view of the left integration bracket 30A is shown. The left integration bracket 30A may include a cushion pan mounting portion 34A designed to be coupled to the cushion pan 26 and disposed at the front of the left integration bracket 30A. The left integration bracket 30A may include a seat frame mounting portion 36A designed to be coupled to the seat frame 18. The seat frame mounting portion 36A may extend downward from and transverse to the cushion pan mounting portion 34A. The seat frame mounting portion 36A may extend along a plane 118A that may be substantially normal to the axis I. The cushion pan mounting portion 34A may include an inner flange 122A that may extend inward toward the seat 14. The inner flange 122A may include a hook 78A. The hook 78A may extend downward from the inner flange 122A. The hook 78A may extend along or substantially parallel to a plane 118A that is substantially normal to the axis I. The hook 78A and the inner flange 122A may form a receptacle 130A for the cross-tube 24 of the seat frame 18. The hook 78A may include ribs 134A disposed on the inside of the hook 78A. Ribs 134A may be low profile crush ribs. The ribs 134A may prevent BSR between the cross-tube 24 and the integration bracket 30A. It may be desirable to prevent BSR and similar noises and vibrations between vehicle parts while a vehicle is moving and/or while vehicle parts are moving relative to one another. The interface between the hook 78A and the cross-tube 24 may facilitate the cushion pan 26 tilt function between the design position A of the cushion pan 26 and the fully upward position B of the cushion pan 26. During movement of the cushion pan 26 between the design position A and the fully upward position B, the cross-tube 24 may rotate around itself. The design of the hook 78A in relation to the inner flange 122A may provide space for the cross-tube 24 to rotate around itself.

With continued reference to FIG. 8A, the left integration bracket 30A may include features for mounting the cushion pan 26 to the left integration bracket 30A. A locating pin 138A may extend upward from the left integration bracket 30A. A recess in the cushion pan 26 may receive the locating pin 138A. The locating pin 138A may also serve an anti-rotation function. That is, the locating pin 138A disposed on the left integration bracket 30A and locating pin 138B disposed on the right integration bracket 30B may position the cushion pan 26 on the left integration bracket 30A and the right integration bracket 30B. The cushion pan attachment features are shown disposed on the left integration bracket 30A. The cushion pan attachment features may include holes 142A that may receive fasteners that may extend downward from the cushion pan 26 into the left integration bracket 30A.

Figure 8B:
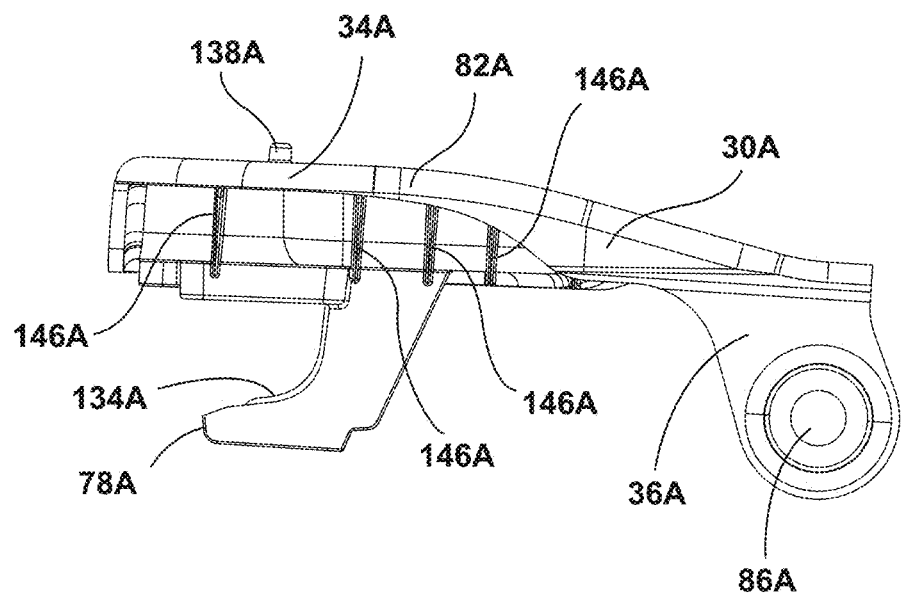
FIG. 8B is a left side elevational view of the left integration bracket of FIG. 8A.

Referring to FIG. 8B, a left side view of the left integration bracket 30A is shown. As previously explained, the outer flange 82A of the integration bracket 30A may form a mating fit 110A with the side bracket 66A to minimize lateral movement of the cushion pan 26. The integration bracket 30A may be positioned adjacent to the protrusion 106A of the side bracket 66A to minimize lateral movement of the cushion pan assembly 22 relative to the seat frame 18. The hook 78A may extend downward from the cushion mounting portion 34A of the left integration bracket 30A. An aperture 86A may be disposed in the seat frame mounting portion 36A of the integration bracket 30A. Ribs 146A may be disposed along the lower surface of the cushion pan mounting portion 34A of the left integration bracket 30A to minimize BSR and to control vibration. The lower surface of the cushion pan mounting portion 34A may rest on the side bracket 66A. The ribs 146A may help minimize BSR and vibrations between the lower surface of the integration bracket 30A and the side bracket 66A when the cushion pan assembly 22 is in the design position A. Ribs 146A may be referred to as anti-flexure ribs. Additionally, ribs 146A may provide increased strength to the left integration bracket 30A, and ribs 146A may simplify the molding process of the left integration bracket 30A. The left and right integration brackets 30A, 30B may be made of molded composites.

Figure 8C:
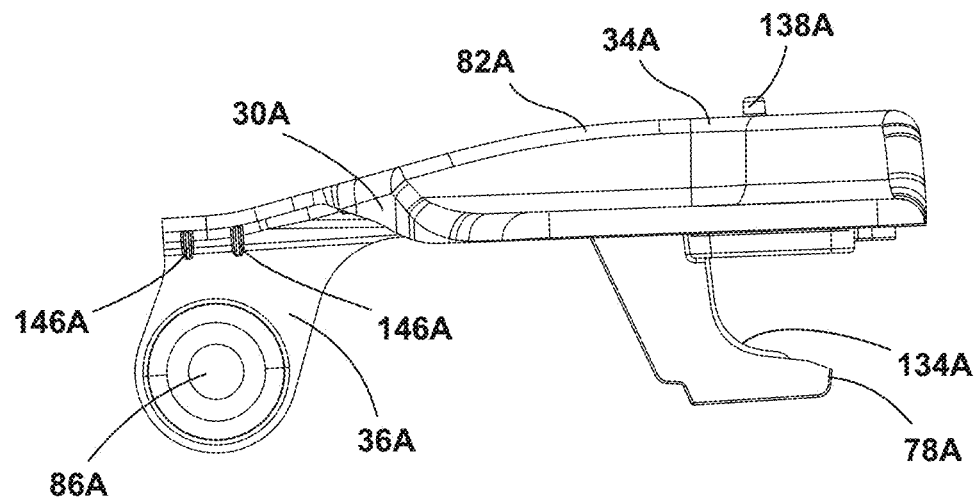
FIG. 8C is a right side elevational view of the left integration bracket of FIG. 8A.

Referring to FIG. 8C, a right side elevational view of the left integration bracket 30A is shown.

Figure 8D:
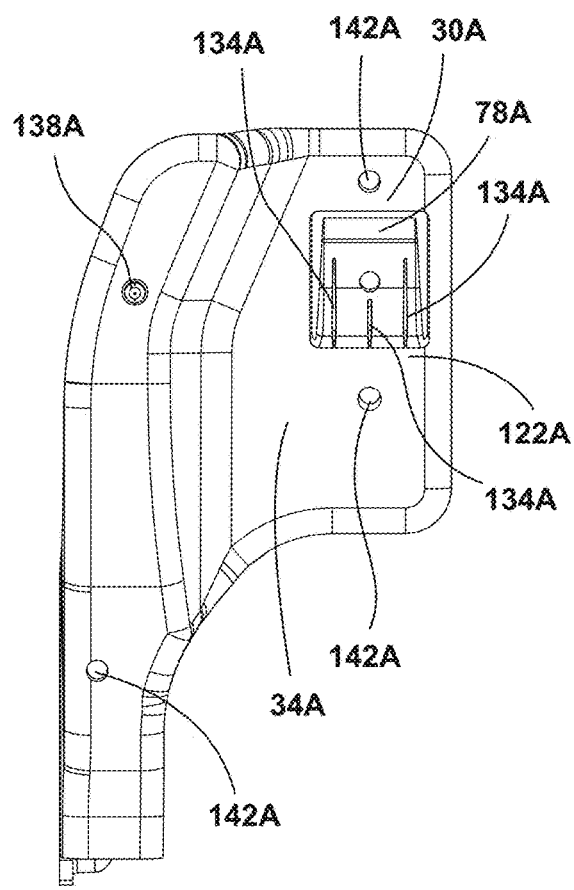
FIG. 8D is a top plan view of the left integration bracket of FIG. 8A.

Referring to FIG. 8D, a top view of the left integration bracket 30A is shown. The locating pin 138A and the holes 142A are shown on the cushion pan mounting portion 34A of the integration bracket 30A. The hook 78A is shown extending downward from the inner flange 122A of the left integration bracket 30A.

Figure 8E:
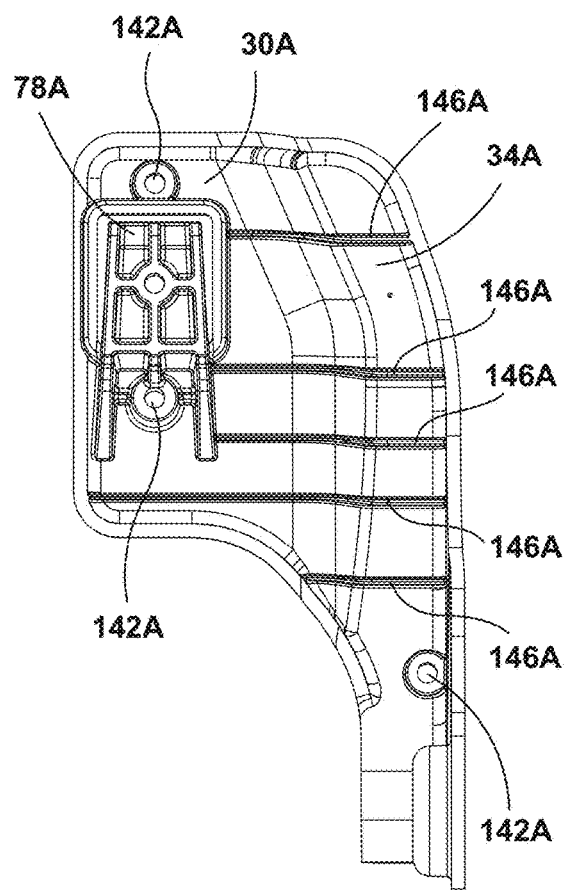
FIG. 8E is a bottom plan view of the left integration bracket of FIG. 8A.

Referring to FIG. 8E, a bottom view of the left integration bracket 30A is shown. The ribs 146A may be disposed along the bottom of the cushion pan mounting portion 34A of the left integration bracket 30A. Holes 142A for receiving fasteners that may extend from the cushion pan 26 are shown.

Figure 8F:
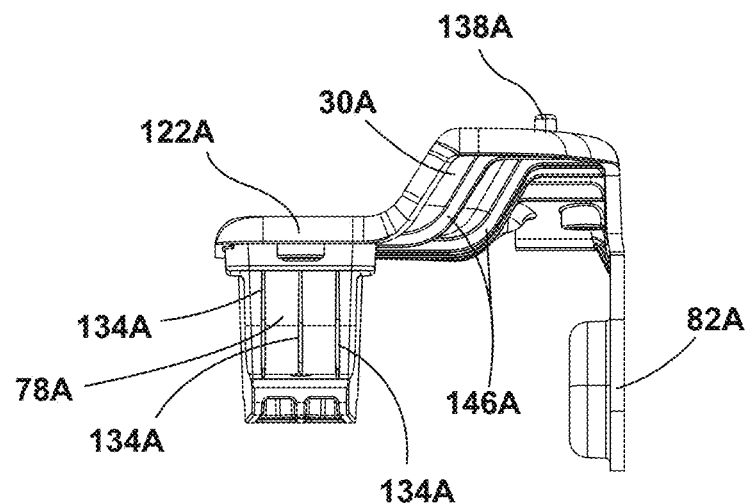
FIG. 8F is a front view of the left integration bracket of FIG. 8A.

Referring to FIG. 8F, a front elevational view of the left integration bracket 30A is shown. Ribs 146A are shown. Ribs 134A may extend outward from the inside of the hook 78A.

Figure 8G:
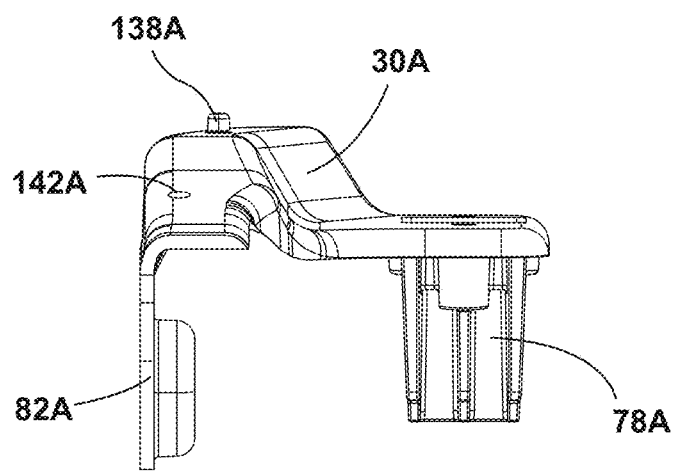
FIG. 8G is a back view of the left integration bracket of FIG. 8A.

Referring to FIG. 8G, a back elevational view of the left integration bracket 30A is shown.

Referring now to the right integration bracket 30B shown in FIGS. 9A-9G, FIG. 9A shows a left side perspective view of the right integration bracket 30B. The hook 78B is shown extending downward from the inner flange 122B that may extend toward the seat 14. The ribs 134B are shown in the inside of the hook 78B. The locating pin 138B may be disposed on the cushion pan mounting portion 34B. The cushion pan mounting portion 34B may slope downward from the outside of the seat 14 toward the inside of the seat 14. Holes 142B for receiving fasteners extending from the cushion pan 26 are shown disposed on the cushion pan mounting portion 34B. As previously explained with reference to FIG. 8A, planes 118B, 126B may be disposed substantially normal to the axis I. Plane 118B may define the location of the outer flange 82B of the cushion pan mounting portion 34B that may extend along the side bracket 66B to minimize lateral movement of the cushion pan assembly 22 relative to the integration bracket 30B and the seat frame 18. The outer flange 82B and the side member 66B may form a mating fit 110B. Plane 126B may define the position of the hook 78B that may extend downward from the inner flange 122B and that may provide a receptacle 130B to receive the cross-tube 24.

Figure 9A:
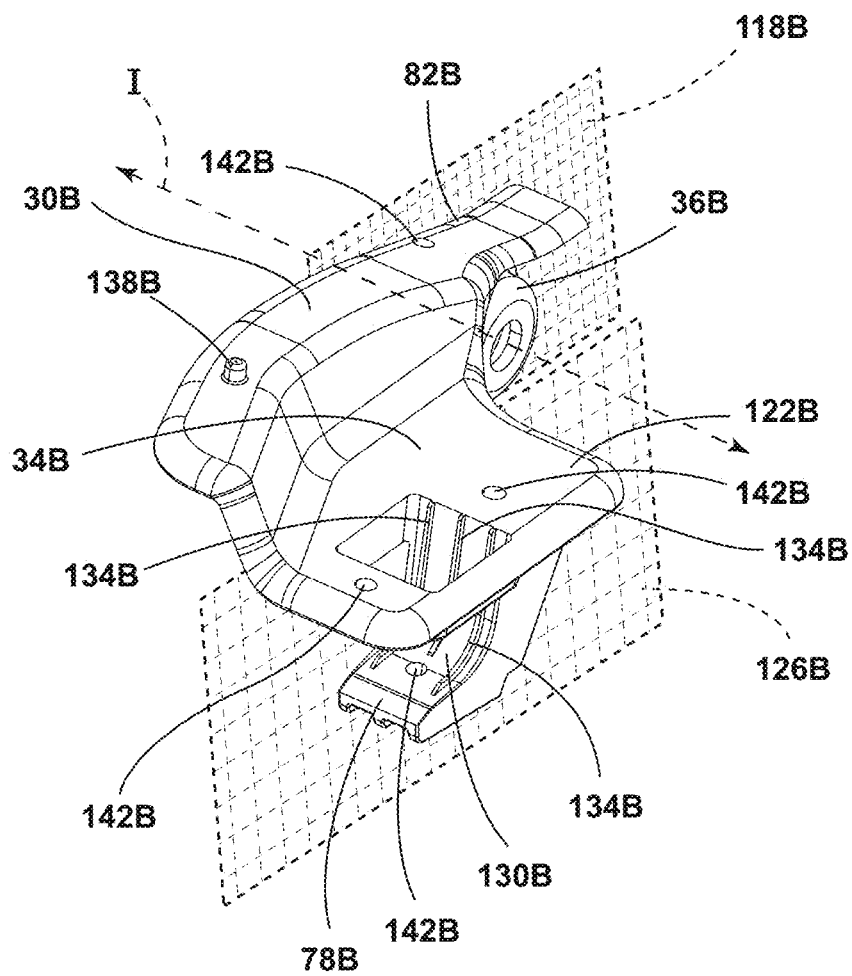
FIG. 9A is a perspective view of a right integration bracket.
Figure 9B:
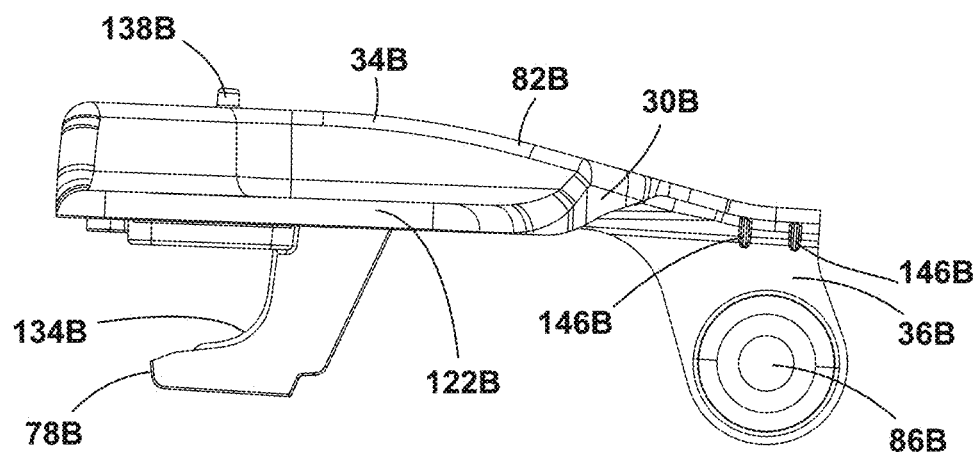
FIG. 9B is a left side elevational view of the right integration bracket of FIG. 9A.

Referring now to FIG. 9B, a left elevational view of the right integration bracket 30B is shown. The inner flange 122B may extend inward toward the seat 14. The hook 78B extends downward from the inner flange 122B to receive the cross-tube 24.

Figure 9C:
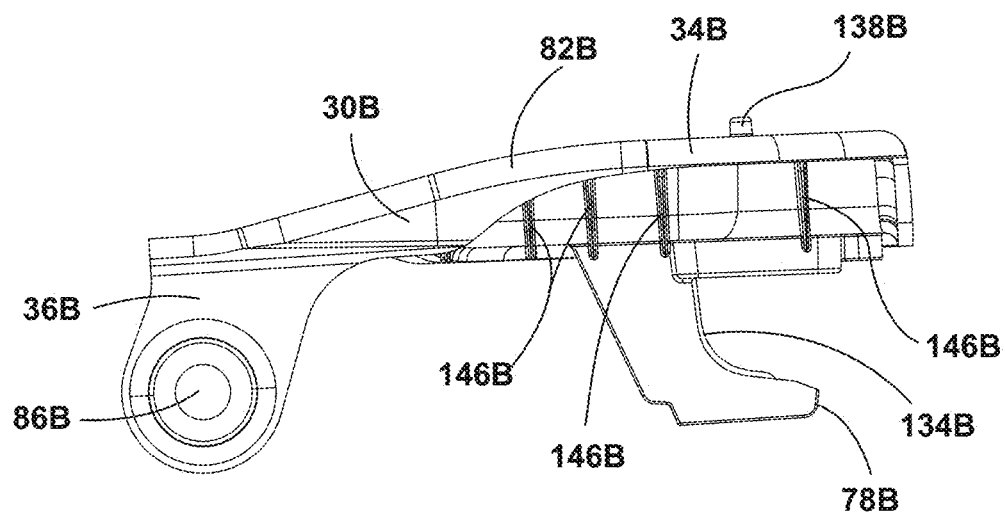
FIG. 9C is a right side elevational view of the right integration bracket of FIG. 9A.

Referring now to FIG. 9C, a right elevational view of the right integration bracket 30B is shown. The ribs 146B may be disposed along the bottom of the cushion pan mounting portion 34B. The outer flange 82B may have a mating fit 110B with the right side bracket 66B.

Figure 9D:
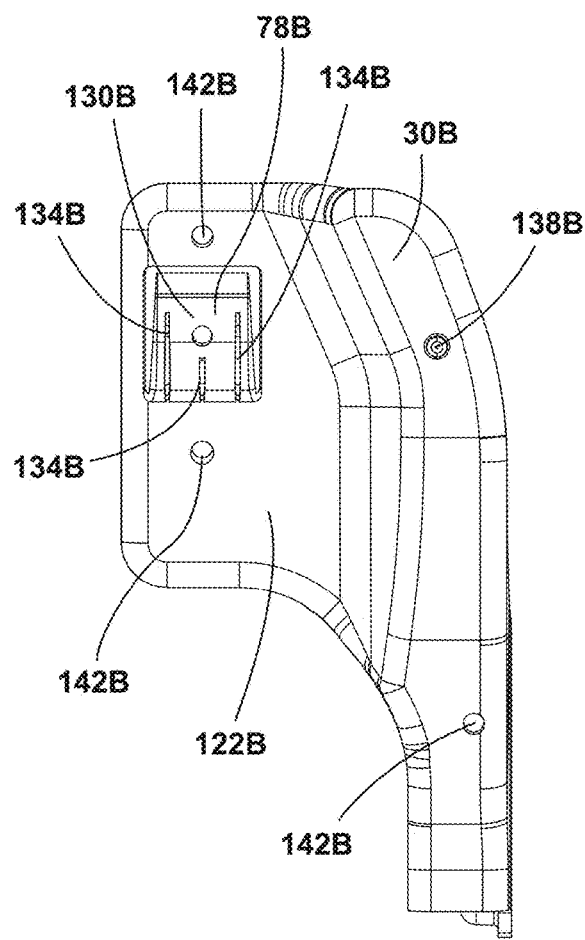
FIG. 9D is a top plan view of the right integration bracket of FIG. 9A.

Referring to FIG. 9D, a top plan view of the right integration bracket 30B is shown. The right integration bracket 30B may include the locating pin 138B and holes 142B for receiving fasteners that may extend from the cushion pan 26. The hook 78B may extend from the inner flange 122B. Ribs 134B may be disposed on the inside of the hook 78B.

Figure 9E:
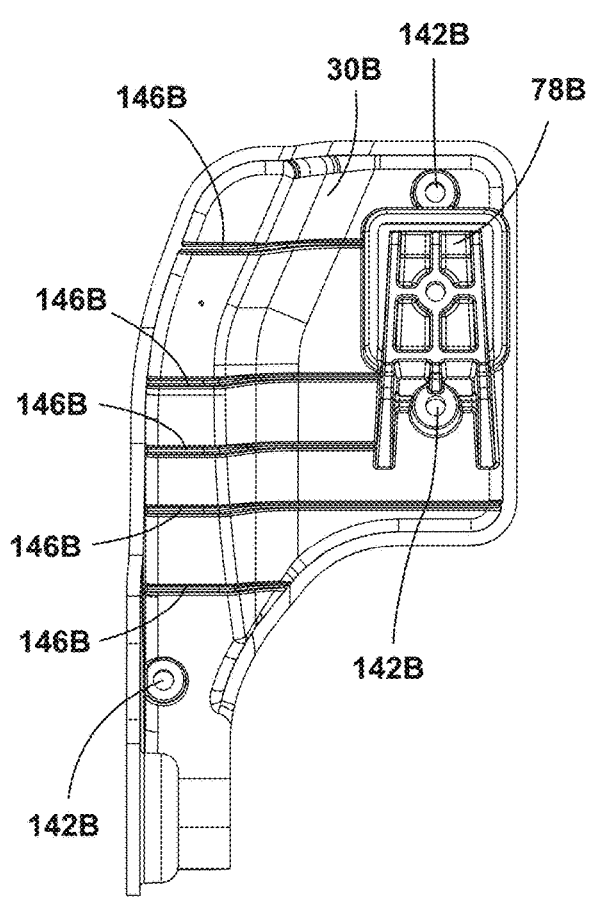
FIG. 9E is a bottom plan view of the right integration bracket of FIG. 9A.

Referring to FIG. 9E, a bottom plan view of the right integration bracket 30B is shown. The right integration bracket 30B includes ribs 146B disposed along the lower surface of the right integration bracket 30B. Holes 142B for receiving the fasteners extending from the cushion pan 26 are shown. Hook 78B may extend downward from the inner flange 122B of the integration bracket 30B.

Figure 9F:
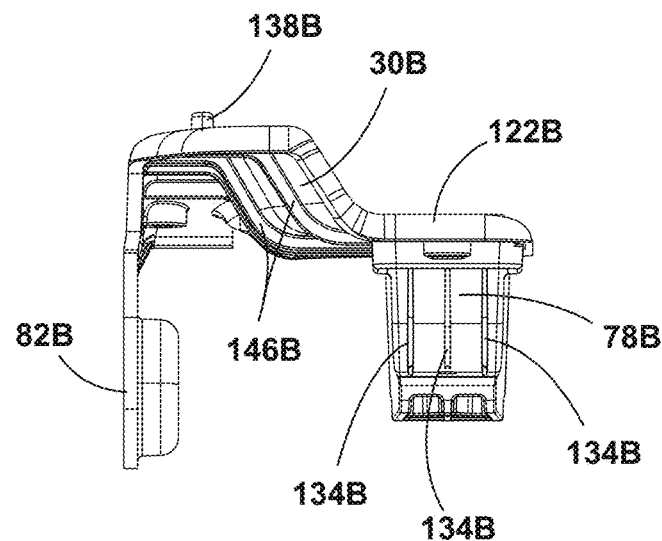
FIG. 9F is a front view of the right integration bracket of FIG. 9A.

Referring to FIG. 9F, a front view of the right integration bracket 30B is shown. The hook 78B may include ribs 134B in the inner portion of the hook 78B for minimizing BSR and vibrations. The ribs 146B may be disposed on the lower surface of the cushion pan mounting portion 34B.

Figure 9G:
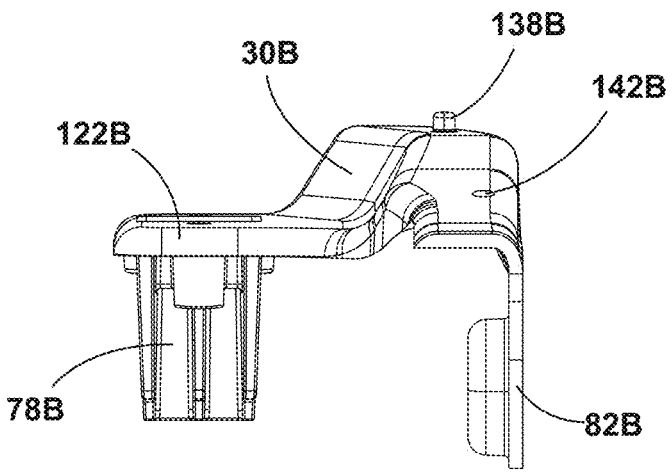
FIG. 9G is a back view of the right integration bracket of FIG. 9A.

Referring to FIG. 9G, a rear view of the right integration bracket 30B is shown. The hook 78B may extend downward from the inner flange 122B of the right integration bracket 30B.

Figure 10:
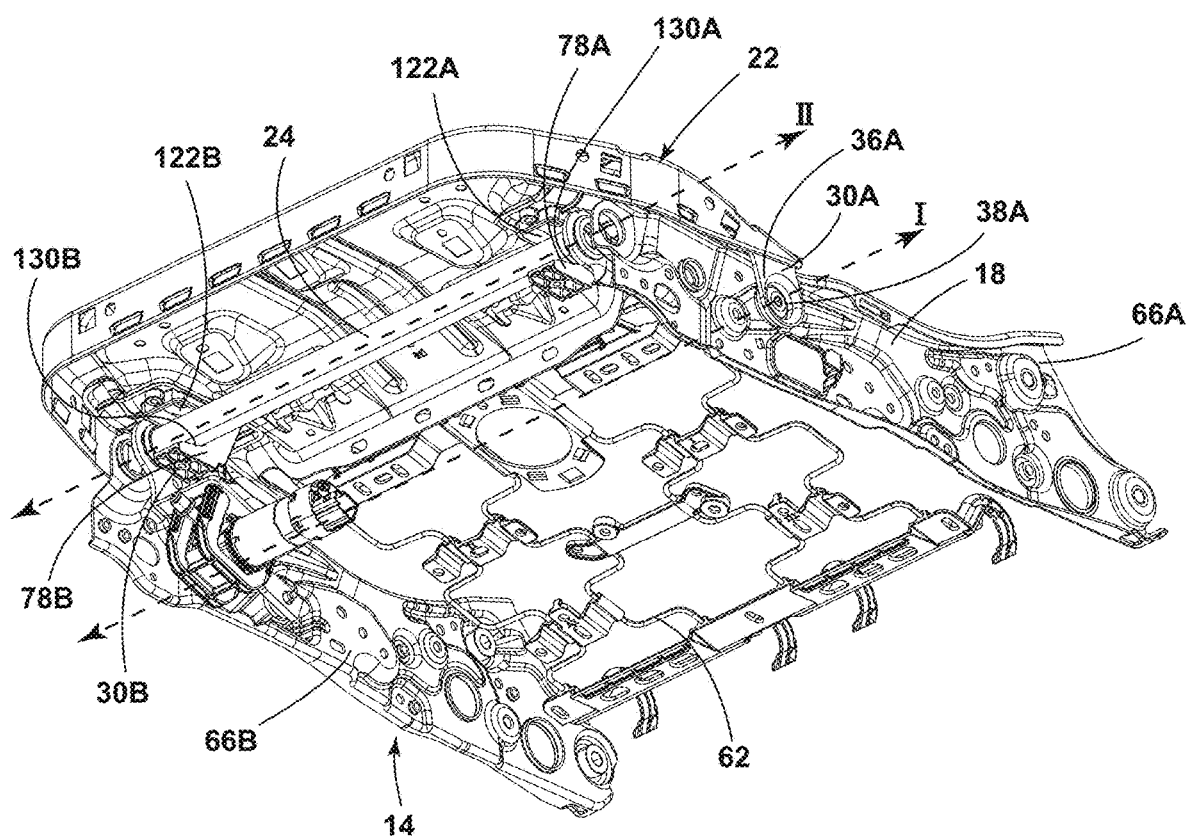
FIG. 10 is a bottom perspective view of the seat frame, the cushion pan, the suspension, and the left and right integration brackets.

Referring now to FIG. 10, a bottom perspective view of the seat 14 is shown. The cushion pan assembly 22 may be pivotably coupled to the seat frame 18. The cushion pan assembly 22 may rotate about the pivotable couplings 38A, 38B defining the axis I. An axis II may extend through the cross-tube 24. The cross-tube 24 may rotate about itself as it moves with the cushion pan 26 between the design position A and the fully upward position B. The cross-tube 24 may be disposed in the receptacles 130A, 130B between the inner flanges 122A, 122B and the downward extending hooks 78A, 78B of each of the left and right integration brackets 30A, 30B.

Figure 11B:
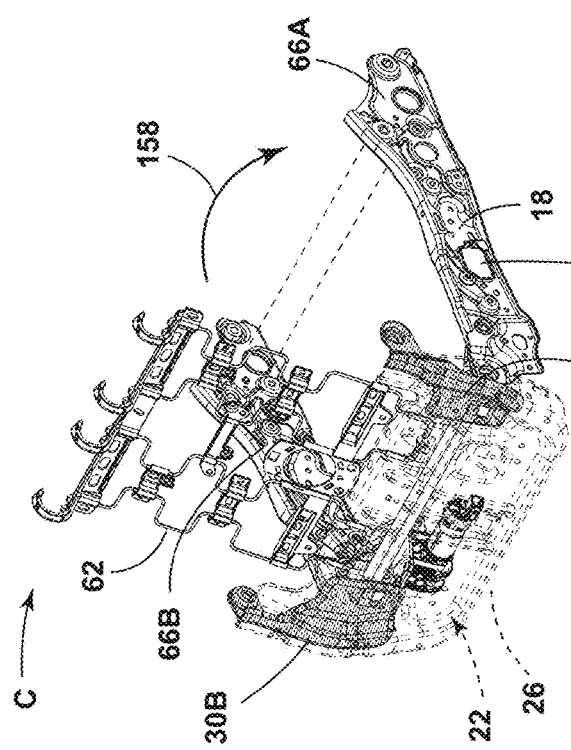
FIG. 11B is a perspective view of a step of assembling a cushion pan assembly and a suspension to a seat frame with the cushion pan assembly in an installation position.
Figure 11C:
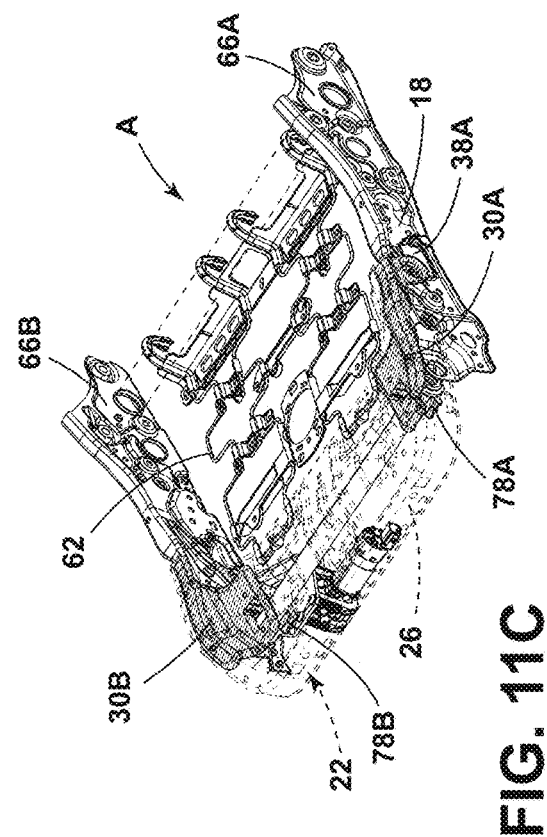
FIG. 11C is a perspective view of a step of assembling a cushion pan assembly and a suspension to a seat frame with the cushion pan assembly in a design position.
Figure 11A:
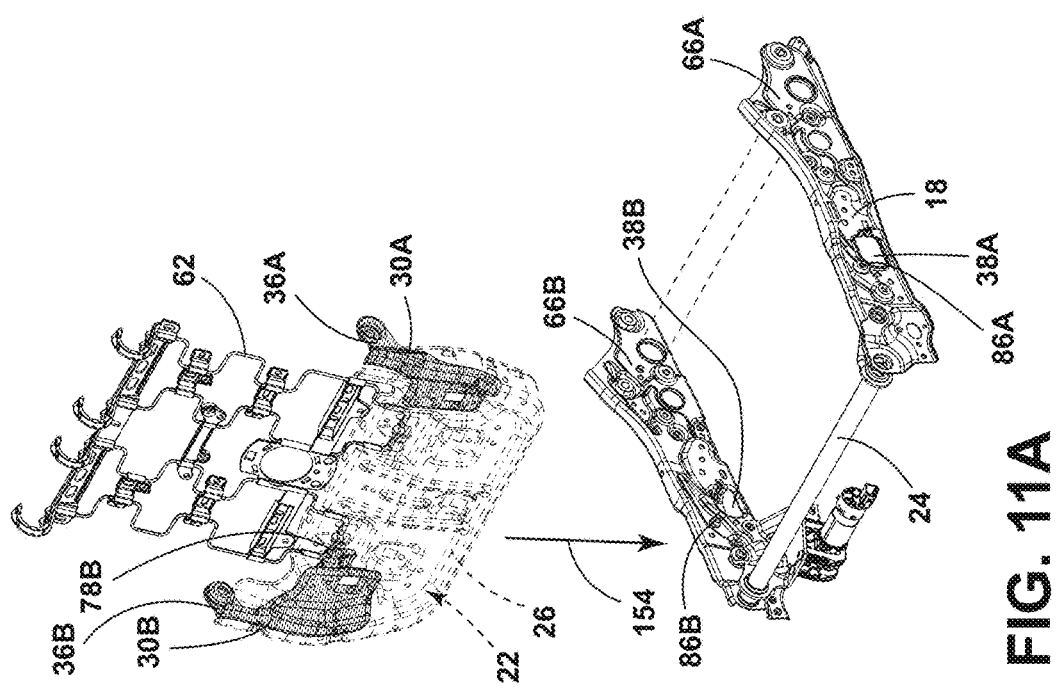
FIG. 11A is a perspective view of a step of assembling a cushion pan assembly and a suspension to a seat frame with the cushion pan assembly and the suspension disposed above the seat frame.

Referring now to FIGS. 11A-11C, a series of views is shown for assembling the cushion pan assembly 22 to the seat frame 18. In the manufacturing facility, the cushion pan assembly 22 and the suspension 62 may be lowered downward in the direction shown by arrow 154 so that the hooks 78A, 78B may be disposed around the cross-tube 24. FIG. 11B shows the cushion pan assembly 22 in the installation position C. The cushion pan assembly 22 may be rotated around the cross-tube 24 from the installation position C to the design position A. As such, the hooks 78A, 78B may allow for convenient positioning of the cushion pan assembly 22 around the cross-tube 24.

Figure 12:
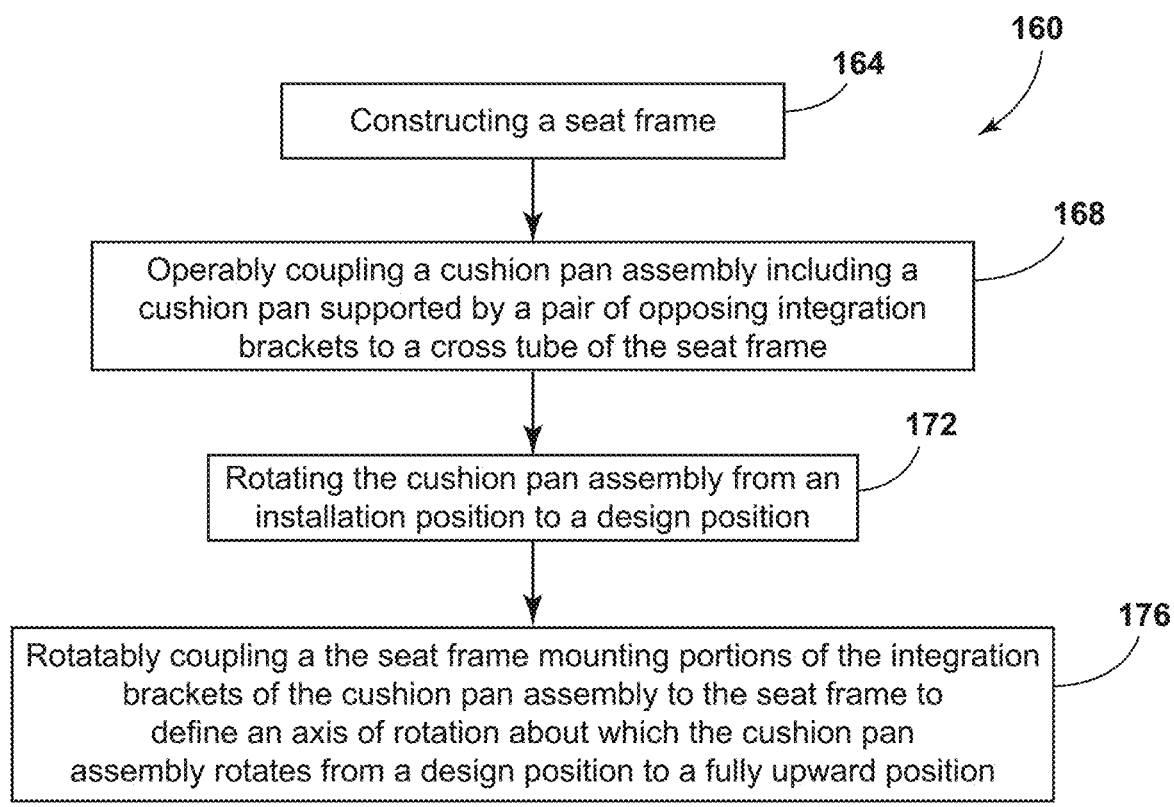
FIG. 12 is a flow diagram showing the steps for the method of manufacturing a vehicle seat.

Referring to FIG. 12, the method 160 of manufacturing a vehicle seat 14 is shown. The method 160 for manufacturing a vehicle seat 14 may include the step 164 of constructing a seat frame 18. The next step 168 may include operably coupling a cushion pan assembly 22 including a cushion pan 26 supported by a pair of opposing integration brackets 30A, 30B to a cross-tube 24 of the seat frame 18. The next step 172 may include rotating the cushion pan assembly 22 from an installation position C to a design position A. Step 176 may include rotatably coupling the seat frame mounting portions 36A, 36B of the integration brackets 30A, 30B of the cushion pan assembly 22 to the seat frame 18 to define an axis I about which the cushion pan assembly 22 rotates from a design position A to a fully upward position B. As such, the design of the hooks 78A, 78B may simplify the coupling of the cushion pan assembly 22 to the seat frame 18 during the seat manufacturing process.

It is to be understood that the cushion pan 26 and the left and right integration brackets 30A, 30B may be fabricated of various materials including metals and/or composites. It is to be understood that the cushion pan 26 and the integration brackets 30A, 30B may be an integral part. For example, the cushion pan 26 and the left and right integration brackets 30A, 30B may be a molded composite.

A variety of advantages may be obtained from use of the disclosure. The left and right integration brackets 30A, 30B may simplify the seat assembly. The left and right integration brackets 30A, 30B may reduce component complexity. The interface between the left and right integration brackets 30A, 30B and the respective left and right side brackets 66A, 66B may minimize lateral movement of the cushion pan assembly 22 relative to the seat frame 18. The pivotable couplings 38A, 38B of the cushion pan assembly 22 to the seat frame 18 with the left and right integration brackets 30A, 30B may allow for rotational movement of the cushion pan assembly 22 between the design and fully upward positions A, B and may provide a location for attachment of the cushion pan assembly 22 to the left and right side brackets 66A, 66B. The composite material of the left and right integration brackets 30A, 30B and the cushion pan 26 may provide a weight savings.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seat for a vehicle seating assembly comprising:
   a seat frame including:
      a cross-member extending across a front portion of the seat frame; and
      a cushion pan assembly rotatably coupled to the seat frame and including:
         a cushion pan; and
         a pair of opposing disconnected integration brackets each including:
            a cushion pan mounting portion disposed between the cushion pan and the seat frame; and
            a seat frame mounting portion pivotably coupled to the seat frame, wherein the cushion pan assembly is rotatable about an axis defined by a pivotable coupling between the seat frame mounting portion of the disconnected integration bracket and the seat frame and between a first position and a second position, wherein if the cushion pan assembly is in the first position, the cushion pan assembly is in a lower position relative to the seat frame than if the cushion pan assembly is in the second position.

2. The seat for a vehicle seating assembly of claim 1, wherein the cushion pan mounting portions of each of the pair of opposing disconnected integration brackets are disposed below opposing cushion pan bolsters of the cushion pan.

3. The seat for the vehicle seating assembly of claim 2, wherein the cushion pan mounting portion includes a hook extending downward from an inner flange and parallel to a plane substantially normal to the axis.

4. The seat for the vehicle seating assembly of claim 3, wherein the hook is positionable around the cross-member.

5. The seat for the vehicle seating assembly of claim 4, wherein the cushion pan mounting portion includes a locating pin extending into the cushion pan.

6. The seat for the vehicle seating assembly of claim 4, wherein the seat frame mounting portion includes a flange extending downward from and transverse to the cushion pan mounting portion.

7. The seat for the vehicle seating assembly of claim 6, wherein the flange extends along a plane substantially normal to the axis.

8. The seat for the vehicle seating assembly of claim 7, wherein the flange is disposed against the seat frame when the cushion pan is in the first position, and wherein an interface between the flange and the seat frame limits lateral movement of the disconnected integration bracket relative to the seat frame.

9. The seat for the vehicle seating assembly of claim 8, wherein the interface between the flange and the seat frame is substantially vertical.

10. A vehicle seat comprising:
    an integration bracket including:
       a cushion pan mounting portion; and
       a seat frame mounting portion;
    a cushion pan; and a seat frame, wherein the cushion pan is disposed on the cushion pan mounting portion of the integration bracket, wherein the integration bracket is pivotably coupled to the seat frame and rotatable about an axis extending laterally through the seat frame between a first position and a second position, and wherein the seat frame mounting portion includes a downward extending outer flange that abuts the seat frame when the integration bracket is in the first position, and wherein the top surface of the cushion pan mounting portion is offset from the top surface of the seat frame mounting portion.

11. The vehicle seat of claim 10, wherein the seat frame includes a side bracket and wherein the side bracket includes a side flange that abuts the downward extending outer flange when the integration bracket is in the first position.

12. The vehicle seat of claim 11, wherein the integration bracket comprises a pair of opposing disconnected integration brackets, wherein the side bracket includes a pair of opposing side brackets, wherein the cushion pan includes a pair of opposing cushion pan bolsters, and wherein the pair of opposing cushion pan bolsters are disposed over the cushion pan mounting portions of each of the pair of opposing disconnected integration brackets, and wherein the cushion pan includes a depression disposed between each of the pair of opposing cushion pan bolsters.

13. The vehicle seat of claim 12, wherein the downward extending outer flanges of each of the pair of opposing disconnected integration brackets abut side flanges of each of the opposing side brackets when the cushion pan is in the first position.

14. The vehicle seat of claim 12, wherein the downward extending outer flange is disposed along a plane substantially normal to the axis.

15. The vehicle seat of claim 10, further comprising:
a cross-member laterally disposed in the seat frame, wherein the cushion pan mounting portion includes a hook that is positionable around the cross-member, wherein the cross-member moves with the cushion pan as the cushion pan moves between the first position and the second position.

16. A method of manufacturing a vehicle seat comprising providing a pair of opposing disconnected integration brackets each having a cushion pan mounting portion and a seat frame mounting portion;
constructing a cushion pan assembly including a cushion pan having a pair of opposing bolsters, each of the pair of opposing bolsters disposed on the cushion pan mounting portion of the pair of opposing disconnected integration brackets;
constructing a seat frame including opposing side brackets;
operably coupling the pair of opposing disconnected integration brackets of the cushion pan assembly to a cross-member of the seat frame;
rotating the cushion pan assembly about the cross-member of the seat frame from an installation position to a first position; and
rotatably coupling the seat frame mounting portions of the pair of opposing disconnected integration brackets of the cushion pan assembly to the opposing side brackets of the seat frame thereby defining an axis of rotation about which the cushion pan assembly rotates between a first position and a second position.

17. The method of manufacturing the vehicle seat of claim 16, further comprising:
positioning a downward extending outer flange of the seat frame mounting portion of each of the opposing disconnected integration brackets adjacent to the opposing side brackets of the seat frame; and
forming a mating fit between the downward extending outer flange of the seat frame mounting portion of each of the opposing disconnected integration brackets and the opposing side brackets of the frame to minimize lateral movement of the cushion pan assembly relative to the seat frame.

18. The method of manufacturing the vehicle seat of claim 17, wherein operably coupling the pair of opposing disconnected integration brackets of the cushion pan assembly to a cross-member of a seat frame includes positioning hooks of the pair of opposing disconnected integration brackets around the cross-member.

19. The method of manufacturing the vehicle seat of claim 16, further comprising:
fabricating the cushion pan assembly from a composite.

20. The method of manufacturing the vehicle seat of claim 19, further comprising:
fabricating the cushion pan assembly as an integral part including the cushion pan and each of the pair of opposing disconnected integration brackets.

* * * * *

UNITED STATES PATENT AND TRADEMARK OFFICE
CERTIFICATE OF CORRECTION

PATENT NO. : 11,135,954 B1  
APPLICATION NO. : 16/822849  
DATED : October 5, 2021  
INVENTOR(S) : Gajda et al.

Page 1 of 1

It is certified that error appears in the above-identified patent and that said Letters Patent is hereby corrected as shown below:

In the Claims

Column 12:  
Claim 17, Line 29;  
"the frame" should be --the seat frame--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*